United States Patent
Relson et al.

(10) Patent No.: US 9,588,758 B1
(45) Date of Patent: Mar. 7, 2017

(54) IDENTIFYING USER MANAGED SOFTWARE MODULES

(71) Applicant: INTERNATIONAL BUSINESS MACHINES CORPORATION, Armonk, NY (US)

(72) Inventors: Peter J. Relson, Ulster Park, NY (US); Ulrich Thiemann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/973,831

(22) Filed: Dec. 18, 2015

(51) Int. Cl.
G06F 9/44 (2006.01)

(52) U.S. Cl.
CPC .................. G06F 8/70 (2013.01)

(58) Field of Classification Search
None
See application file for complete search history.

(56) References Cited

U.S. PATENT DOCUMENTS

| | | | |
|---|---|---|---|
| 5,530,862 A | 6/1996 | Wadsworth et al. | |
| 6,658,659 B2 | 12/2003 | Hiller et al. | |
| 6,970,960 B1 | 11/2005 | Sarfati | |
| 7,925,865 B2 | 4/2011 | Chou et al. | |
| 7,996,686 B2 | 8/2011 | LeGendre et al. | |
| 8,799,569 B2 | 8/2014 | Harris et al. | |
| 9,065,867 B2 | 6/2015 | Prasad et al. | |
| 9,495,149 B1 | 11/2016 | Relson et al. | |
| 2005/0262287 A1 | 11/2005 | Tran et al. | |
| 2006/0130036 A1 | 6/2006 | Kimmel et al. | |
| 2006/0130038 A1* | 6/2006 | Claussen | G06F 8/24 717/168 |
| 2008/0184220 A1* | 7/2008 | Chen | G06F 8/65 717/171 |

(Continued)

FOREIGN PATENT DOCUMENTS

| | | |
|---|---|---|
| CN | 101094129 A | 12/2007 |
| CN | 103368943 A | 10/2013 |
| WO | 2015096688 A1 | 7/2015 |

OTHER PUBLICATIONS

U.S. Appl. No. 15/093,110, Entitled "Identifying User Managed Software Modules", filed Apr. 7, 2016.

(Continued)

*Primary Examiner* — Daxin Wu
(74) *Attorney, Agent, or Firm* — William H. Hartwell

(57) ABSTRACT

A method for identifying user managed software modules includes: receiving a request for a directed load of a software module into memory, wherein the request includes an address for storing the software module; storing the software module at the address in the received request; adding a name and an address range of the stored software module to a data structure identifying software modules that have been loaded into memory via directed loads; receiving a query that includes an input module name or an input address range; and responsive to determining that the input module name or input address range of the received query is not stored in one or more data structures identifying one or more software modules that have been loaded into memory without directed loads, searching the data structure identifying software modules that have been loaded into memory via directed loads for the respective query.

20 Claims, 8 Drawing Sheets

(56) References Cited

U.S. PATENT DOCUMENTS

| | | | |
|---|---|---|---|
| 2010/0005316 A1* | 1/2010 | LeGendre | G06F 21/121 |
| | | | 713/189 |
| 2015/0199377 A1* | 7/2015 | Peters | G06F 11/1076 |
| | | | 707/770 |
| 2016/0041921 A1* | 2/2016 | Friedman | G06F 12/1009 |
| | | | 711/207 |

OTHER PUBLICATIONS

Appendix P.: List of IBM Patents or Patent Applications Treated as Related, Dated Apr. 7, 2016, 2 pages.
Appendix P List of IBM Patents or Patent Applications Treated as Related. Dated Aug. 22, 2016. Two pages.
Original U.S. Appl. No. 15/243,049, filed Aug. 22, 2016.
"Memory Module Tracking", An IP.com Prior Art Database Technical Disclosure, IP.com No. 000240999, IP.com Electronic Publication: Mar. 17, 2015, pp. 1-6.

\* cited by examiner

US 9,588,758 B1

IDENTIFYING USER MANAGED SOFTWARE MODULES

BACKGROUND

The present invention relates generally to the field of memory management, and more particularly to user managed, or directed, loading of software modules.

There are a plurality of known ways for computer operating systems to load software modules into storage (for example, persistent storage and/or memory). For example, during a "normal" load process, a system decides where and how to allocate the dynamic storage to fetch the module into from disk. On the other hand, during a "directed" load process, a caller of the module provides the location of the storage for the module to be loaded into (i.e. the caller "directs" the system where to put the module), once the module is fetched from disk.

SUMMARY

Embodiments of the present invention disclose a method, computer program product, and system for identifying user managed software modules. The method includes receiving a request for a directed load of a software module into memory, wherein the request for the directed load includes an address for storing the software module. The method further includes storing the software module at the address in the received request. The method further includes adding a name and an address range of the stored software module to a data structure identifying software modules that have been loaded into memory via directed loads. The method further includes receiving a query that includes an input module name or an input address range. The method further includes, responsive to determining that the input module name or input address range of the received query is not stored in one or more data structures identifying one or more software modules that have been loaded into memory without directed loads, searching the data structure identifying software modules that have been loaded into memory via directed loads for the respective input module name or input address range.

DETAILED DESCRIPTION

Embodiments in accordance with the present invention recognize that operating systems may provide users with the ability to manage the storage of software modules after they are loaded. This is sometimes referred to as a "directed load" or a "load with address". When a directed load is used, because the system does not track the module as much as it does for a non-directed load, in situations for which it may be helpful to find the name of the module in which a given address resides, it may be difficult to determine that module name without manually examining storage. Embodiments of the present invention improve the functionality of the operating system in this area by taking advantage of data that the operating system may already keep to facilitate the determination of the module name. In cases where system services may be used to correlate a given address to a module tracked by one or more system control blocks, embodiments of the present invention enhance system services so that when the module cannot be found via the system control blocks, the system services optionally attempt to use the directed load results to locate the information.

Figure 1:
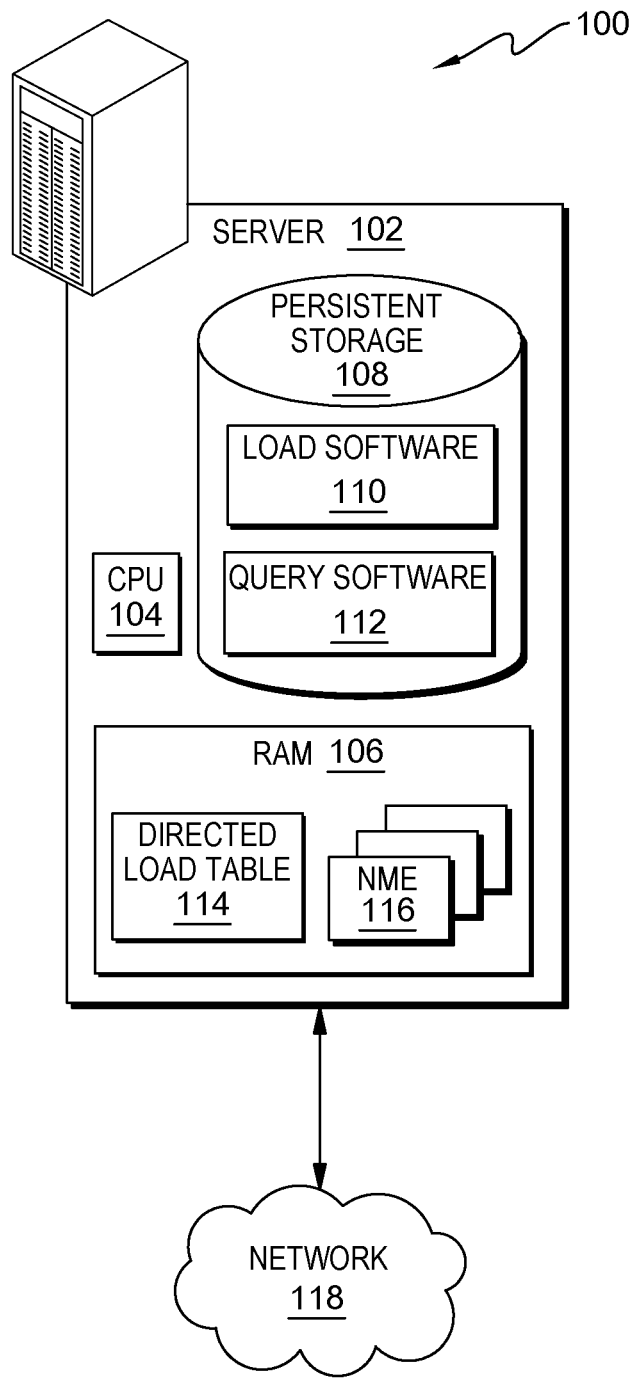
FIG. 1 is a functional block diagram illustrating a directed load environment, in an embodiment in accordance with the present invention.

Embodiments in accordance with the present invention will now be described in detail with reference to the Figures. FIG. 1 is a functional block diagram, generally designated 100, illustrating a directed load environment, in an embodiment in accordance with the present invention.

Directed load environment 100 includes server 102 and other computing devices (not shown), all interconnected over network 118. Server 102 includes random access memory (RAM) 106, central processing unit (CPU) 104, and persistent storage 108. Server 102 may be a Web server, or any other electronic device or computing system, capable of processing program instructions and receiving and sending data. In some embodiments, server 102 may be a laptop computer, a tablet computer, a netbook computer, a personal computer (PC), a desktop computer, a personal digital assistant (PDA), a smart phone, or any programmable electronic device capable of communicating over a data connection to network 118. In other embodiments, server 102 may represent server computing systems utilizing multiple computers as a server system, such as in a distributed computing environment. In general, server 102 is representative of any electronic devices or combinations of electronic devices capable of executing machine-readable program instructions and communicating with service provider via network 118 and with various components and devices (not shown) within directed load environment 100.

Server 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Load software 110 and query software 112 are stored in persistent storage 108, which also includes operating system software (not shown), as well as software that enables server 102 to load and query modules on the system, also referred to as server 102, by users (e.g., calling programs), and communicate with other computing devices (not shown) of directed load environment 100 over a data connection on network 118. In other example embodiments, load software 110 and query software 112 may be components of an operating system software.

Load software 110 and query software 112 are computer programs, or sets of computer programs, that are stored in persistent storage 108. Load software 110 enables a user to load modules during server 102 runtime and tracks directed loads via directed load table 114 and one or more normal module entries (NMEs) 114. Query software 112 may retrieve, for an input module name, the address range for that module. In computing, an address range, also referred to as an address space, may define a range of discrete addresses, each of which may correspond to a network host, peripheral device, disk sector, a memory cell or other logical or physical entity. In other words, the address range corresponds to the module's location in storage, where the storage can comprise any medium by which software can be stored (for example, persistent storage, volatile memory, and/or network storage). For applications that use query software 112, if the module cannot be found in NME 116, query software 112 may additionally examine the information in directed load table 114. If an entry is found for which the queried address lies within the module (e.g., using the starting and ending addresses), then the module name for that entry may be returned. In other example embodiments, query software 112 may allow a user to determine a module's address range using the module name as an input.

Directed load table 114 and one or more data structures called NMEs 116 exist in RAM 106 during system runtime when one or more modules are loaded either by the system, or directed loaded by a user (i.e., calling program). In an example where NMEs 116 are used, a calling program asks server 102 to load a module. Server 102 allocates storage for the module, loads the module into the allocated storage, then creates an NME 116 to track the allocated storage for the module to allow server 102 to free the storage once the module is no longer needed. Directed load table 114 is used to track the name of a loaded module and the starting and ending addresses, also referred to as an address range, of the loaded module. In an example where a directed load table 114 is used, a calling program allocates storage for a module, then the calling program requests server 102 to load the module into the allocated storage. Server 102 then stores the address range of the module in directed load table 114. The calling program frees the allocated storage once the calling program is done with the module.

Figure 8:
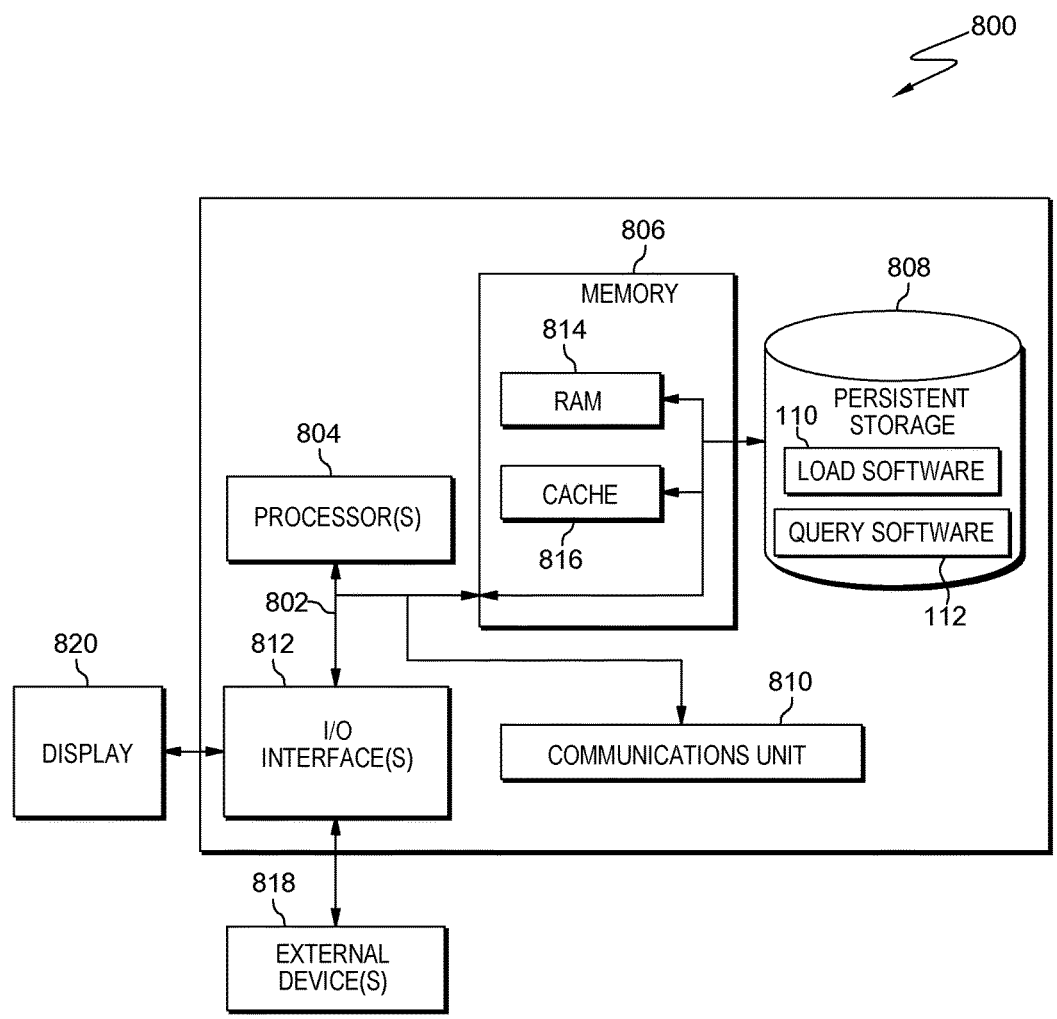
FIG. 8 depicts a block diagram of components of the server computer executing the load software and query software, in an embodiment in accordance with the present invention.

Server 102 may include internal and external hardware components, as depicted and described in further detail with respect to FIG. 8.

In FIG. 1, network 118 is shown as the interconnecting fabric between server 102 and with various components and devices (not shown) within directed load environment 100. In practice, the connection may be any viable data transport network, such as, for example, a LAN or WAN. Network 118 can be for example, a local area network (LAN), a wide area network (WAN) such as the Internet, or a combination of the two, and include wired, wireless, or fiber optic connections. In general, network 118 can be any combination of connections and protocols that will support communications between server 102 and with various components and devices (not shown) within directed load environment 100.

Figure 2:
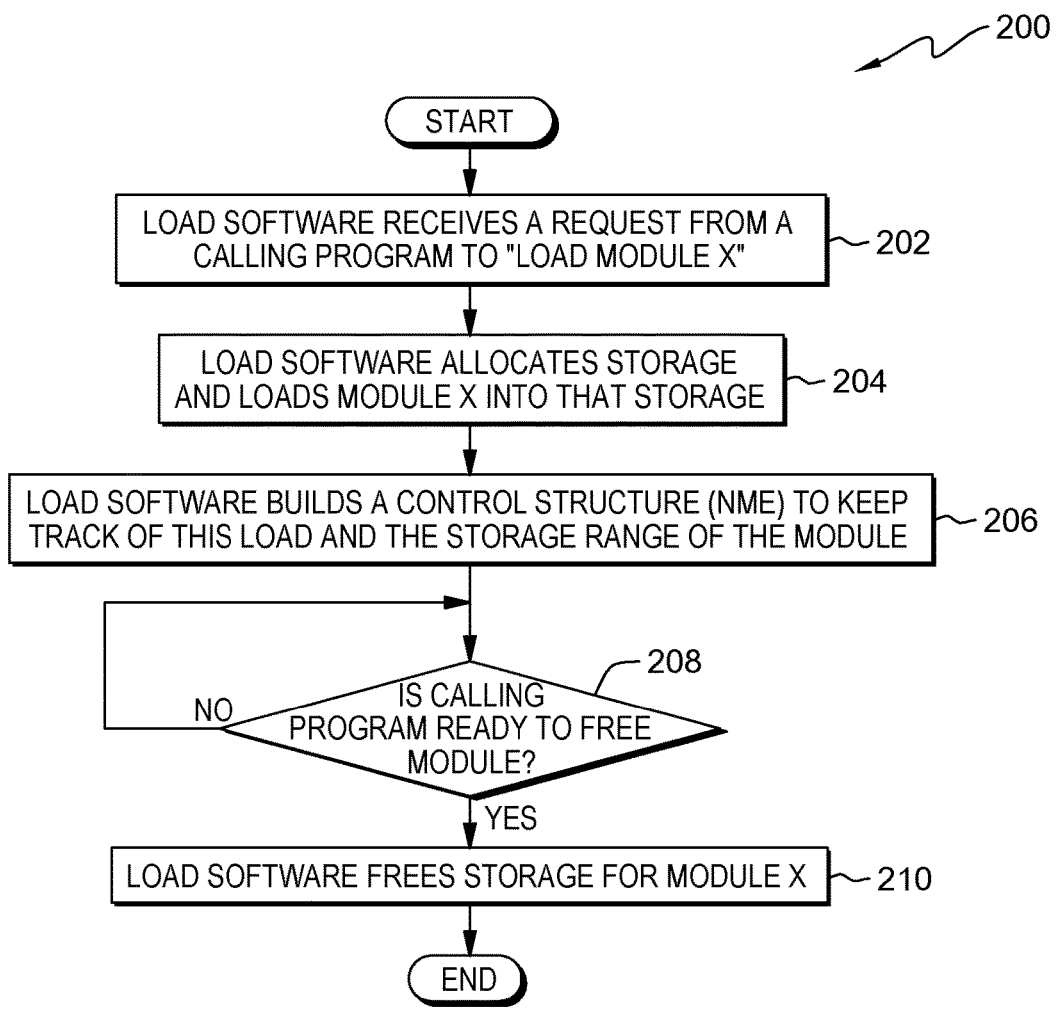
FIG. 2 is a flowchart depicting operational steps of load software, on a server computer within the directed load environment of FIG. 1, for loading a module into a storage without using the directed load function, in an embodiment in accordance with the present invention.

FIG. 2 is a flowchart, generally designated 200, depicting operational steps of load software 110, on a server computer within the directed load environment of FIG. 1, for loading a module into a storage without using the directed load function, in an embodiment in accordance with the present invention. In an example embodiment, a calling program on server 102 issues a request to load software 110 to load module "X". In other example embodiments, the calling program may execute on any computing device within directed load environment 100.

Load software 110 receives a request from a calling program to load module "X" as depicted in step 202. For example, load software 110 may receive the load module request through a set of application programming interfaces (APIs) used by calling programs executing on sever 102 or from calling programs executing on other computing devices (not shown) within directed load environment 100. In computer programming, an application programming interface (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising the interface.

Load software 110 allocates storage and loads module "X" into that storage in step 204. For example, load software 110 allocates storage, via a "new" operation, in RAM 106 to contain module "X" and then loads module "X" in the allocated storage. In other example embodiments, allocated storage in RAM 106 may be performed using any dynamic memory allocation technique.

Load software 110 builds a control structure to track the load and the address range of module "X" in step 206. For example, load software 110 allocates storage to create a new NME 116 control block to track the load and address range of module "X". In other example embodiments, load software 110 may create a NME 116 prior to creating the storage space for module "X", then store the address range of module "X" upon the load of module "X".

In decision step 208, load software 110 determines if the calling program is ready to free module "X". For example, load software 110 either determines, or is told by the calling program, that the address range for module "X" is ready to be freed. Upon determining the calling program no longer requires module "X", load software 110 may free the allocated storage so that the address range, or address range, of module "X" may be reused as depicted in step 210.

Figure 3:
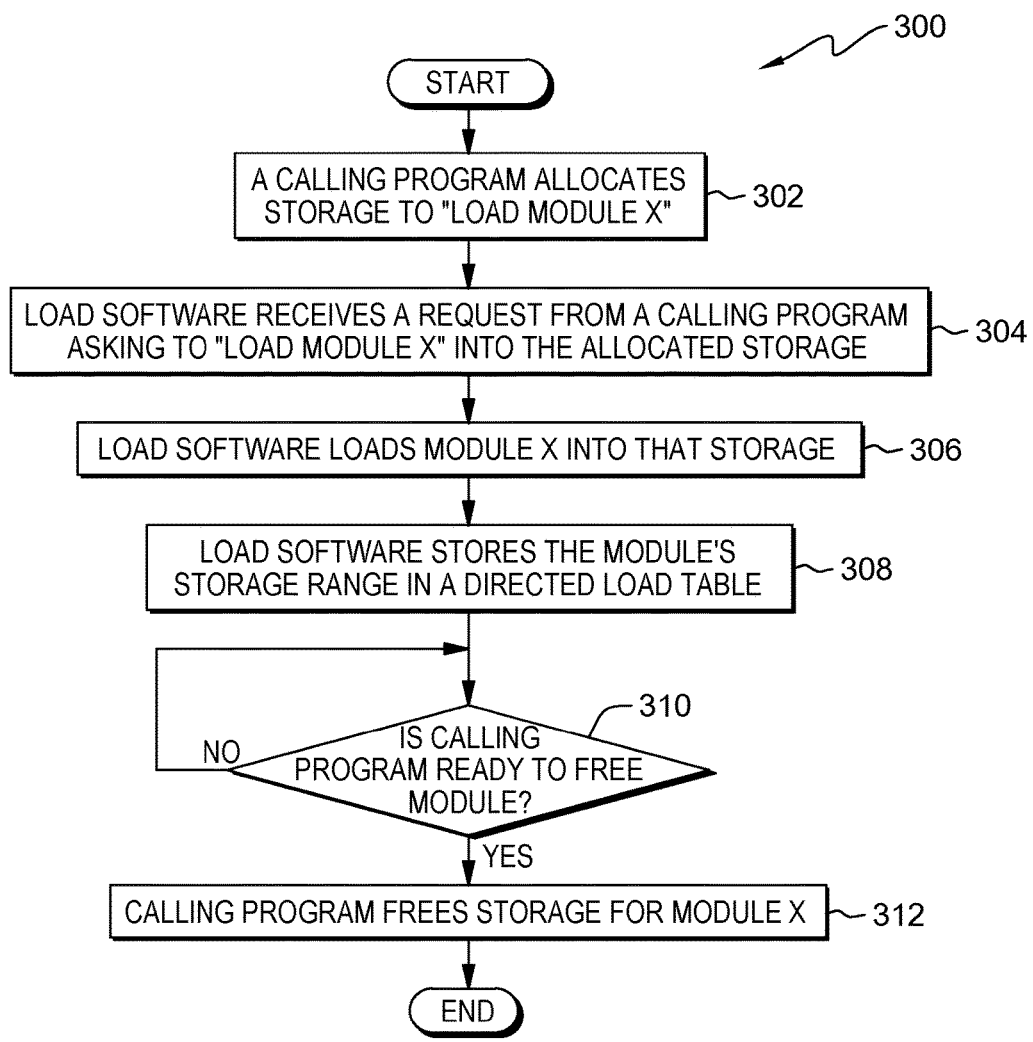
FIG. 3 is a flowchart depicting operational steps of load software on a server computer within the directed load environment of FIG. 1, for performing a directed load of a module into storage, in an embodiment in accordance with the present invention.

FIG. 3 is a flowchart, generally designated 300, depicting operational steps of load software 110, on a server computer within the directed load environment of FIG. 1, for performing a directed load of a module into storage, in an embodiment in accordance with the present invention. In an example embodiment, a calling program submits a request to load software 110 to load module "X" in an address range allocated by the calling program.

A calling program allocates storage in RAM 106 to "load module x" as depicted in step 302. The calling program may use any known (or yet to be known) allocation method, including those described in relation to FIG. 2, step 202.

Upon allocating the address range for module "X", load software 110 receives a request from the calling program indicating to load module "X" into the allocated storage as depicted in step 304. In other example embodiments, load software 110 may receive the load module request from a queue monitored by load software 110. In computer science, a queue is a particular kind of abstract data type, or collection, in which the entities in the collection are kept in order and the principal (or only) operations on the collection are the addition and removal of entities from the queue. In an example embodiment, the queue is a First-In-First-Out (FIFO) data structure. In a FIFO data structure, the first element added to the queue will be the first one to be removed. In another example embodiment, load software 110 may receive the load module request from a stack that uses a Last-In-First-Out (LIFO) data structure. In a LIFO data structure, the last element added to the stack will be the first one to be removed.

In step 306, load software 110 then loads module "X" into that storage. Load software 110 may take, for example, the following as inputs: (i) the address of the allocated storage, (ii) the size of module "X", (iii) a function or subroutine, and/or (iv) a return code or return status of the module load.

Load software 110 then stores the module's address range in a directed load table as depicted in step 308. Upon loading module "X" into the address range provided by the calling program, load software 110 stores the address range of module "X" in directed load table 114 to track the storage and allow a calling program to query the module name. If directed load table 114 does not exist, load software 110 may create a new instance of directed load table 114. In some example embodiments, directed load table may be created during system initialization. In another example embodiment, directed load table 114 may be a table that uses a wrapping feature, so that older entries may be replaced when space for newer entries is needed. In other example embodiments, directed load table 114 may be a queue of individual elements, or a stack, or an array.

In decision step 310, the calling program determines if module "X" is ready to be freed. For example, upon determining module "X" is no longer required, the calling program may issue a request to load software 110 to unload module "X". Load software 110 may then unload module "X" and use a previously stored function provided by the calling program to initiate the freeing of the storage, or load software 110 may just return a return code or status code indicating whether the unloading of module "X" was successful or unsuccessful.

In step 312, the calling program may then free the allocated address range for module "X".

Figure 4:
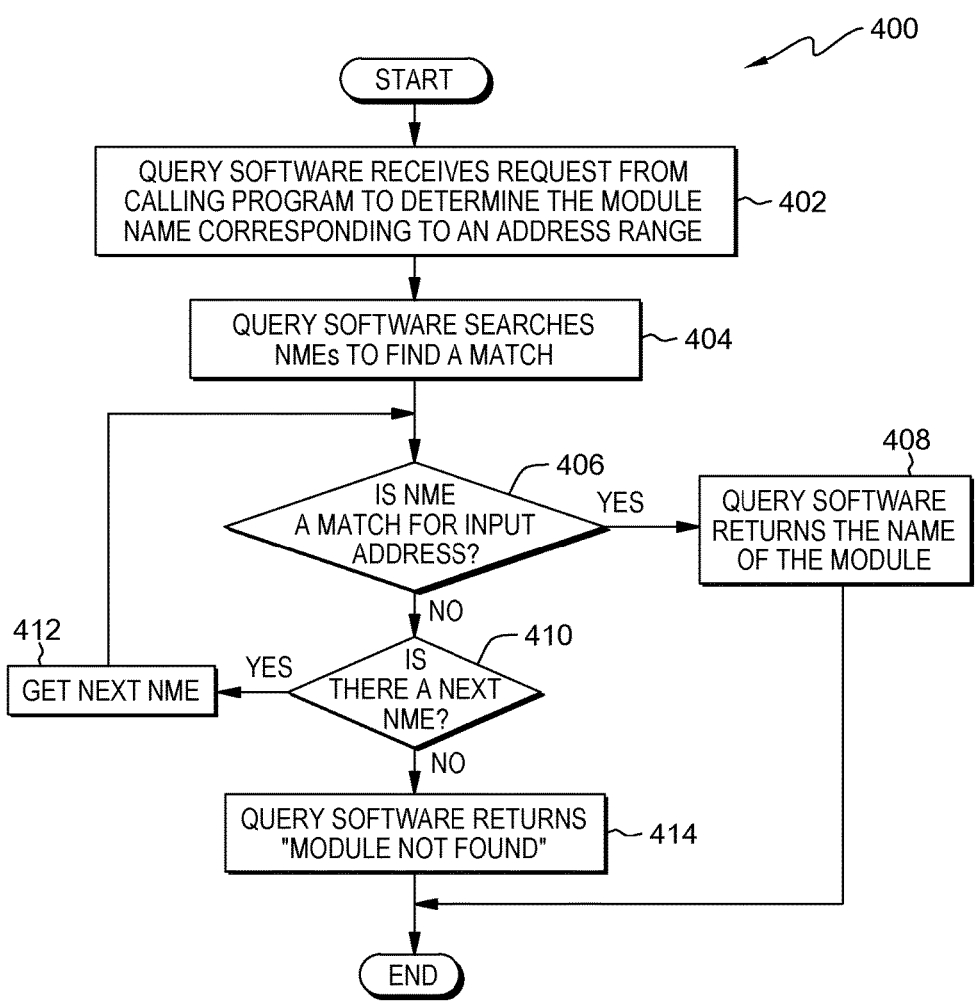
FIG. 4 is a flowchart depicting operational steps of query software, performing a query to determine a module name that corresponds to an address range without a directed load table, in an embodiment in accordance with the present invention.

FIG. 4 is a flowchart, generally designated 400, depicting operational steps of query software, performing a query to determine a module name that corresponds to an address range without a directed load table, in an embodiment in accordance with the present invention. In an example embodiment using existing query techniques, a calling program queries query software 112 to determine the module name corresponding to an input address as depicted in step 402. In one example embodiment, prior to searching NME 116, the calling program may obtain a serialization lock on NME 116 to prevent updates to the information. This would ensure that the searching is not adversely affected by unexpected updates to NME 116. In another example embodiment, the updates to NME 116 may be serialized by the same resource that covers the updates to NME 116.

In step 404, query software 112 searches one or more NME 116's to find a match for the corresponding input address of the module provided by the calling program. For example, query software 112 searches each NME 116 and compares the stored address range in the NME 116 to the input address provided by the calling program.

In decision step 406, query software 112 determines if the corresponding input address was found in NME 116. If the corresponding input address was found in NME 116 ("Yes" branch, decision 406), query software 112 returns the name of the module stored in NME 116 as depicted in step 408. If the corresponding input address was not found in NME 116 ("No" branch, decision 406), query software 112 checks to see if there is a next NME 116 as depicted in decision step 410.

In decision step 410, query software 112 determines if there is a next NME 116 in the queue. If there is a next NME 116 in the queue ("Yes" branch, decision 410), query software 112 gets the next NME 116 to examine as depicted in step 412. If there is not a next NME 116 in the queue ("No" branch, decision 410), query software 112 returns an indication that no match has been found (e.g., "module not found"), to the calling program as depicted in step 414. In one example embodiment, query software 112 may return an error code in the form of a string, or in a numerical form. In other example embodiments, query software 112 may return additional information in the error messages, such as the supplied address range, or supplied module name.

Figure 5:
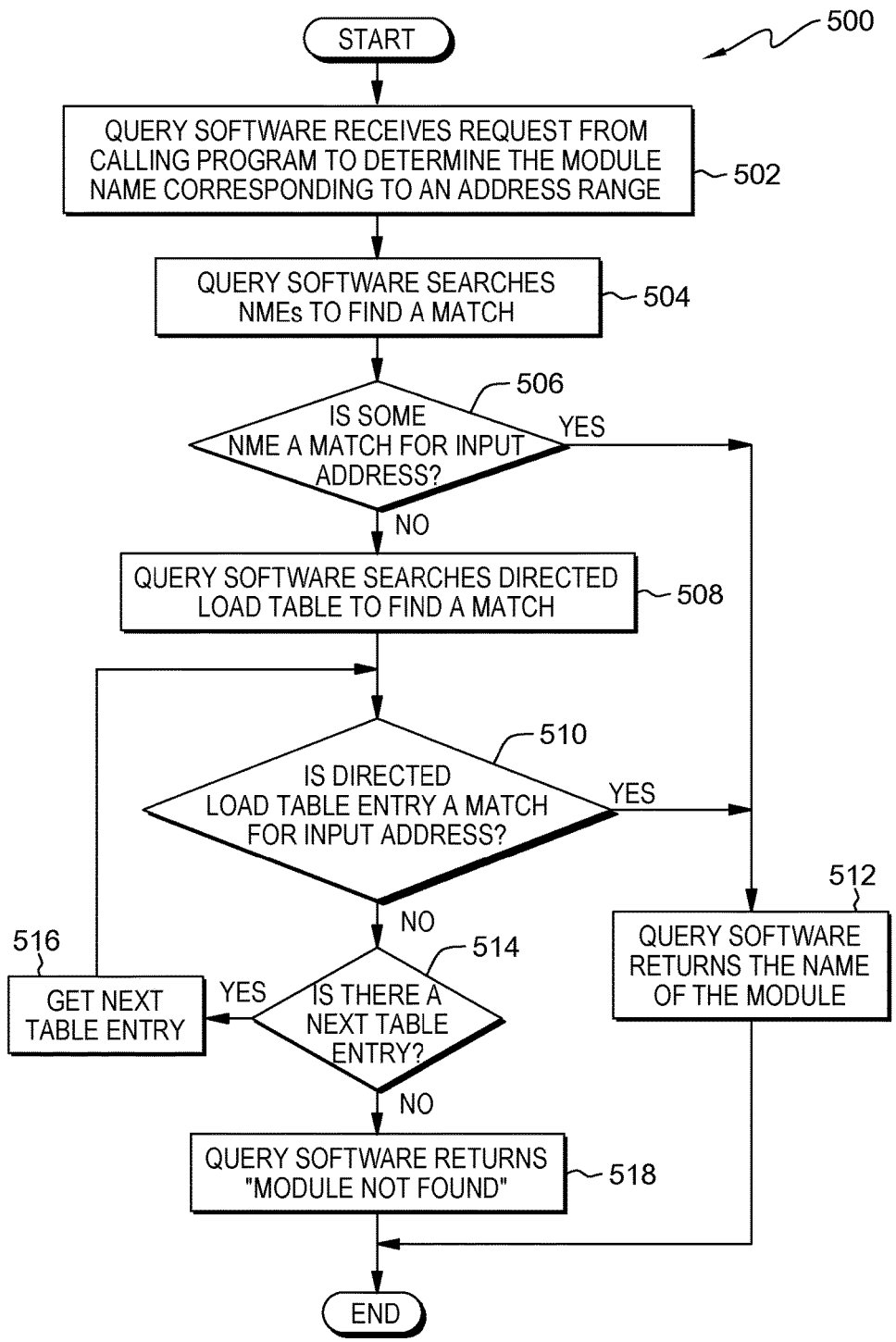
FIG. 5 is a flowchart depicting operational steps of query software, performing a query to determine a module name that corresponds to an address range with a directed load table within the directed load environment of FIG. 1, in an embodiment in accordance with the present invention.

FIG. 5 is a flowchart, generally designated 500, depicting operational steps of query software, performing a query to determine a module name that corresponds to an address range with a directed load table within the directed load environment of FIG. 1, in an embodiment in accordance with the present invention. In an example embodiment, a calling program queries query software 112 to determine the module name corresponding to an input storage address as depicted in step 502. For example, the calling program passes in an address, or an address range, of a module for query software 112 to return the name of the module. In another example embodiment, query software 112 may take a name of the module as an input and return the address range of the module loaded at the address.

In step 504, query software 112 searches NME 116's as described in FIG. 4 for the module using the input address. In decision step 506, query software 112 determines if the corresponding input address was found in NME 116. If the corresponding input address was found in NME 116 ("Yes" branch, decision 506), query software 112 returns the name of the module stored in NME 116 as depicted in step 512. If the corresponding input address was not found in NME 116 ("No" branch, decision 506), query software 112 searches directed load table 114 for the corresponding input address as depicted in step 508.

In decision step 510, query software 112 determines if the corresponding input address was found in the entry of directed load table 114. If the corresponding input address was found in the entry of directed load table 114 ("Yes" branch, decision 510), query software 112 returns the name of the module stored in the table entry as depicted in step 512. If the corresponding input address was not found in the entry of directed load table 114 ("No" branch, decision 510), query software 112 determines if there is a next entry in directed load table 114 to examine as depicted in decision step 514. In some cases, the directed load table "matching" may also include a time-related element. For example, the directed load table might have two entries that cover the same address range, an older entry and a newer entry (because the table entries are never deleted, and the table wraps). In the present embodiment, the rule is to use the newer entry.

In decision step 514, query software 112 determines if there is a next entry in directed load table 114. If there is a next entry in directed load table 114 ("Yes" branch, decision 514), query software 112 gets the next entry in directed load table 114 to examine as depicted in step 516. If there is not a next entry in directed load table 114 ("No" branch, decision 514), query software 112 returns "module not found" to the calling program as depicted in step 518.

Figure 6:
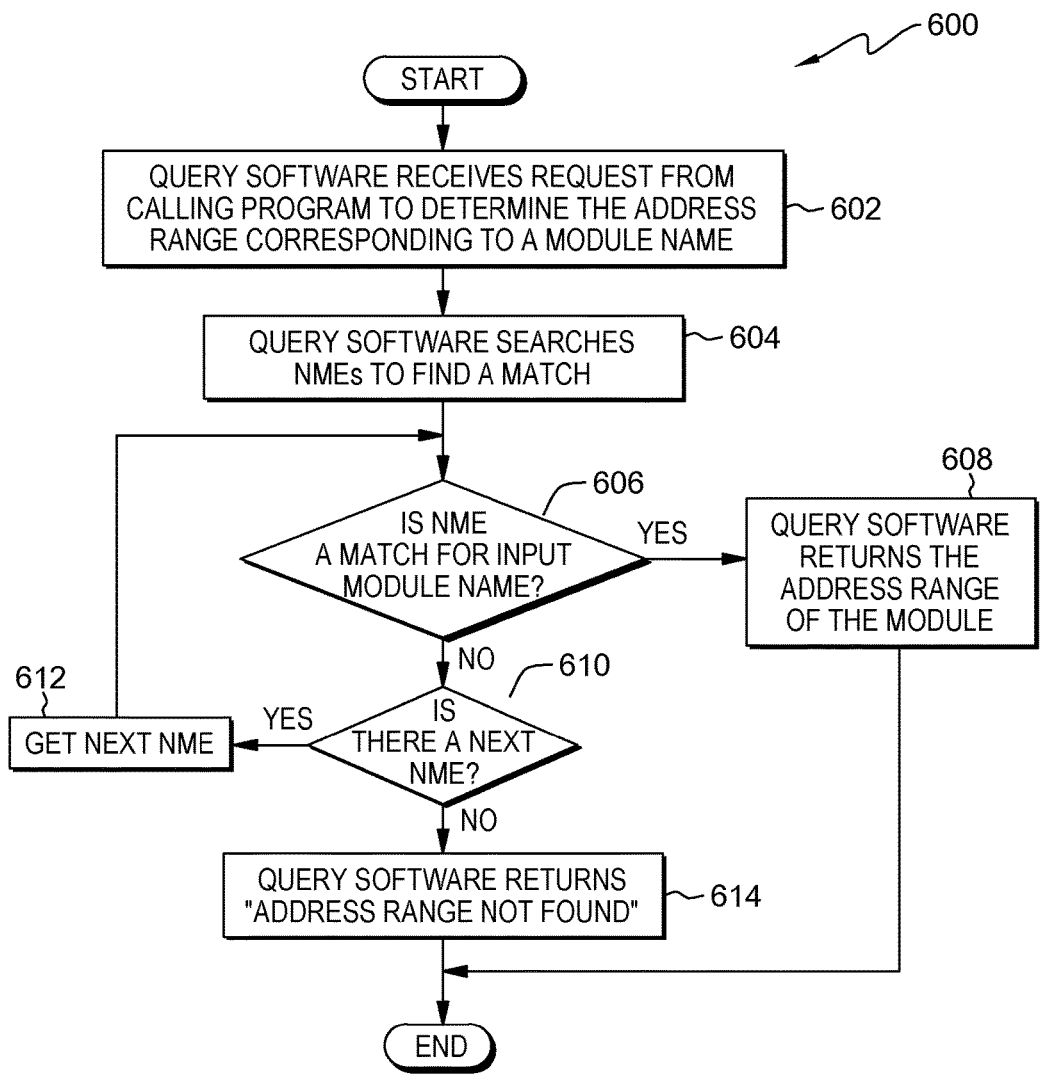
FIG. 6 is a flowchart depicting operational steps of query software, performing a query to determine an address range that corresponds to a module name without a directed load table, in an embodiment in accordance with the present invention.

FIG. 6 is a flowchart depicting operational steps of query software, performing a query to determine an address range that corresponds to an input module name without a directed load table, in an embodiment in accordance with the present invention. In an example embodiment using current query techniques, a calling program queries query software 112 to determine the address range corresponding to an input module name as depicted in step 602.

In step 604, query software 112 searches one or more NME 116's to find a match for the corresponding module name of the input module name provided by the calling program. For example, query software 112 searches each NME 116 and compares the stored module name of the NME 116 to the input module name provided by the calling program.

In decision step 606, query software 112 determines if the corresponding input module name was found in NME 116. If the corresponding input module name was found in NME 116 ("Yes" branch, decision 606), query software 112 returns the address range associated with the software module matching the input module name stored in NME 116 as depicted in step 608. If the corresponding input module name was not found in NME 116 ("No" branch, decision 606), query software 112 checks to see if there is a next NME 116 as depicted in decision step 610.

In decision step 610, query software 112 determines if there is a next NME 116 in the queue. If there is a next NME 116 in the queue ("Yes" branch, decision 610), query software 112 gets the next NME 116 to examine as depicted in step 612. If there is not a next NME 116 in the queue ("No" branch, decision 610), query software 112 returns "address range not found" to the calling program as depicted in step 614.

Figure 7:
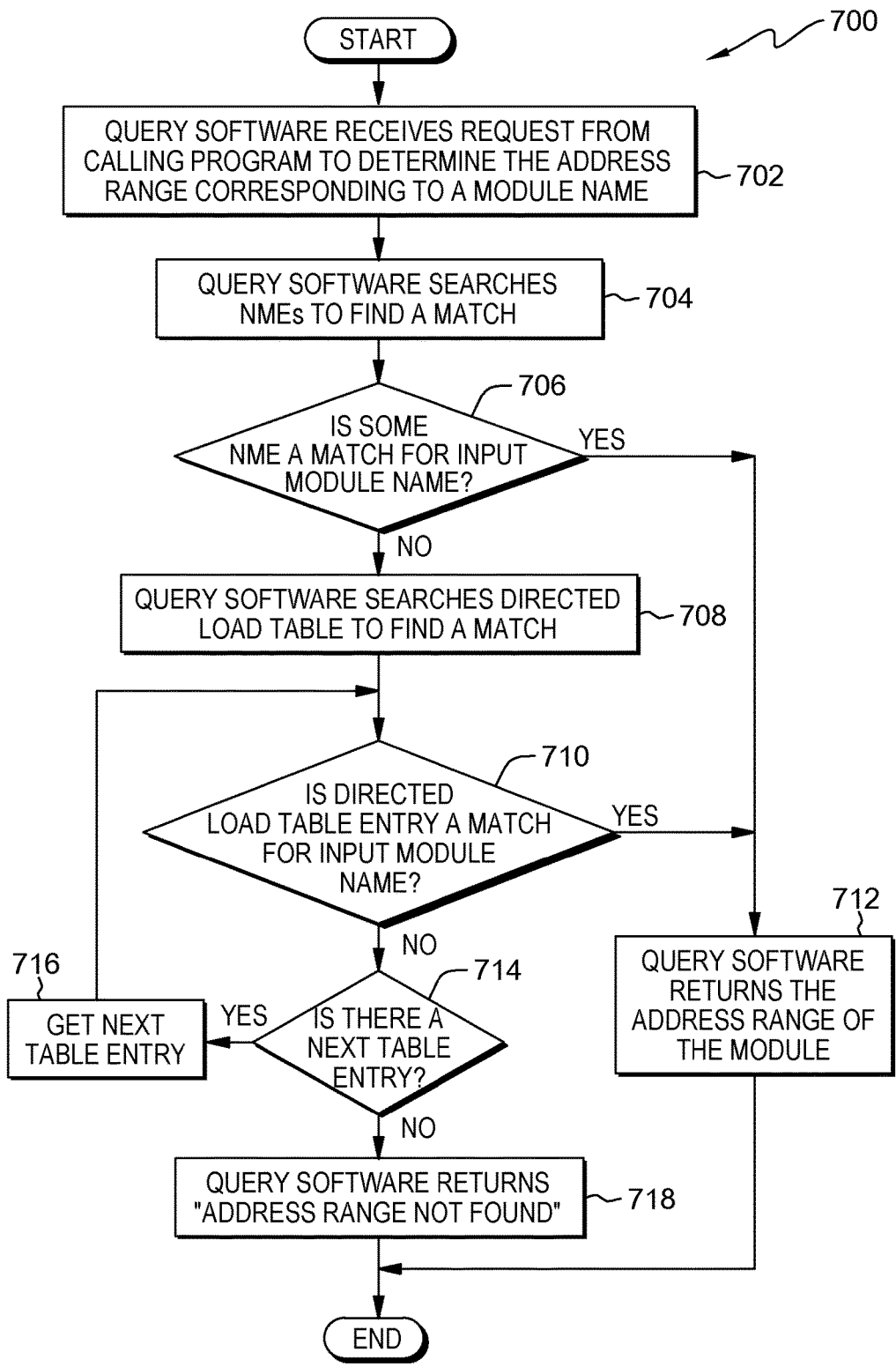
FIG. 7 is a flowchart depicting operational steps of query software, performing a query to determine an address range that corresponds to a module name with a directed load table within the directed load environment of FIG. 1, in an embodiment in accordance with the present invention.

FIG. 7 is a flowchart depicting operational steps of query software, performing a query to determine an address range that corresponds to an input module name with a directed load table within the directed load environment of FIG. 1, in an embodiment in accordance with the present invention. In an example embodiment, a calling program queries query software 112 to determine the address range corresponding to an input module name as depicted in step 702. For example, the calling program passes in a module name of a module for query software 112 to return the address range.

In step 704, query software 112 searches NME 116's as described in FIG. 6 for the module. In decision step 706, query software 112 determines if the corresponding input module name was found in NME 116. If the corresponding module name was found in NME 116 ("Yes" branch, decision 706), query software 112 returns the address range of the module stored in NME 116 as depicted in step 712. If the corresponding input module name was not found in NME 116 ("No" branch, decision 706), query software 112 searches directed load table 114 for the corresponding input module name as depicted in step 708.

In decision step 710, query software 112 determines if the corresponding module name was found in the entry of directed load table 114. If the corresponding input module name was found in the entry of directed load table 114 ("Yes" branch, decision 710), query software 112 returns the address range of the module stored in the table entry as depicted in step 712. If the corresponding input module name was not found in the entry of directed load table 114 ("No" branch, decision 710), query software 112 determines if there is a next entry in directed load table 114 to examine as depicted in decision step 714.

In decision step 714, query software 112 determines if there is a next entry in directed load table 114. If there is a next entry in directed load table 114 ("Yes" branch, decision 714), query software 112 gets the next entry in directed load table 114 to examine as depicted in step 716. If there is not a next entry in directed load table 114 ("No" branch, decision 714), query software 112 returns "address range not found" to the calling program as depicted in step 718.

FIG. 8 depicts a block diagram, generally designated 800, of components of the server computer executing load software 110 and query software 112, in an embodiment in accordance with the present invention. It should be appreciated that FIG. 8 provides only an illustration of one implementation and does not imply any limitations with regard to the environments in which different embodiments may be implemented. Many modifications to the depicted environment may be made.

Server 102 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806, which may be similar to RAM 106, includes random access memory (RAM) 814 and cache memory 816. In general, memory 806 can include any suitable volatile or non-volatile computer readable storage media.

Load software 110 and query software 112 are stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices, including resources of network 118 (not shown). In these examples, communications unit 810 includes one or more network interface cards. Communications unit 810 may provide communications through the use of either or both physical and wireless communications links. Load software 110 and query software 112 may be downloaded to persistent storage 808 through communications unit 810.

I/O interface(s) 812 allows for input and output of data with other devices that may be connected to server 102. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., load software 110 and query software 112, can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, by a computer system, a request for a directed load of a software module into memory, wherein the request for the directed load includes an address for storing the software module;
storing, by the computer system, the software module at the address according to the received request;
adding, by the computer system, a name and an address range of the stored software module to a data structure identifying software modules that have been loaded into memory via directed loads;
receiving, by the computer system, a query that includes an input module name or an input address range; and
responsive to determining that the input module name or input address range of the received query is not stored in one or more data structures identifying one or more software modules that have been loaded into memory without directed loads, searching, by the computer system, the data structure identifying software modules that have been loaded into memory via directed loads for the respective input module name or input address range.

2. The computer-implemented method of claim 1, further comprising:
responsive to determining that the input module name of the received query is stored in the data structure identifying software modules that have been loaded into memory via directed loads, returning, by the computer system, an address range associated with a software module matching the input module name in the data structure.

3. The computer-implemented method of claim 1, further comprising:
responsive to determining that the input address range of the received query is stored in the data structure identifying software modules that have been loaded into memory via directed loads, returning, by the computer system, a name associated with a software module matching the input address range in the data structure.

4. The computer-implemented method of claim 1, further comprising:
responsive to determining that the input module name or input address range of the received query is not stored in the data structure identifying software modules that have been loaded into memory via directed loads, returning, by the computer system, an indication that no match has been found.

5. The computer-implemented method of claim 1, wherein the data structure identifying software modules that have been loaded into memory via directed loads includes a wrapping feature that replaces older entries when space for newer entries is required.

6. The computer-implemented method of claim 1, wherein the data structure identifying software modules that have been loaded into memory via directed loads is a table.

7. The computer-implemented method of claim 1, wherein the one or more data structures identifying one or more software modules that have been loaded into memory without directed loads includes one or more system control blocks.

8. A computer program product comprising:
one or more computer readable storage media and program instructions stored on the one or more computer readable storage media, the program instructions comprising:
program instructions to receive a request for a directed load of a software module into memory, wherein the request for the directed load includes an address for storing the software module;
program instructions to store the software module at the address according to the received request;
program instructions to add a name and an address range of the stored software module to a data structure identifying software modules that have been loaded into memory via directed loads;
program instructions to receive a query that includes an input module name or an input address range; and
program instructions to, responsive to determining that the input module name or input address range of the received query is not stored in one or more data structures identifying one or more software modules that have been loaded into memory without directed loads, search the data structure identifying software modules that have been loaded into memory via directed loads for the respective input module name or input address range.

9. The computer program product of claim 8, further comprising:
program instructions to, responsive to determining that the input module name of the received query is stored in the data structure identifying software modules that have been loaded into memory via directed loads, return an address range associated with a software module matching the input module name in the data structure.

10. The computer program product of claim 8, further comprising:
program instructions to, responsive to determining that the input address range of the received query is stored in the data structure identifying software modules that have been loaded into memory via directed loads, return a name associated with a software module matching the input address range in the data structure.

11. The computer program product of claim 8, further comprising:
program instructions to, responsive to determining that the input module name or input address range of the received query is not stored in the data structure identifying software modules that have been loaded into memory via directed loads, return an indication that no match has been found.

12. The computer program product of claim 8, wherein the data structure identifying software modules that have been loaded into memory via directed loads includes a wrapping feature that replaces older entries when space for newer entries is required.

13. The computer program product of claim 8, wherein the data structure identifying software modules that have been loaded into memory via directed loads is a table.

14. The computer program product of claim 8, wherein the one or more data structures identifying one or more software modules that have been loaded into memory without directed loads include one or more system control blocks.

15. A computer system comprising:
one or more computer processors;
one or more computer readable storage media;
program instructions stored on the computer readable storage media for execution by at least one of the one or more processors, the program instructions comprising:
program instructions to receive a request for a directed load of a software module into memory, wherein the request for the directed load includes an address for storing the software module;
program instructions to store the software module at the address according to the received request;
program instructions to add a name and an address range of the stored software module to a data structure identifying software modules that have been loaded into memory via directed loads;
program instructions to receive a query that includes an input module name or an input address range; and
program instructions to, responsive to determining that the input module name or input address range of the received query is not stored in one or more data structures identifying one or more software modules that have been loaded into memory without directed loads, search the data structure identifying software modules that have been loaded into memory via directed loads for the respective input module name or input address range.

16. The computer system of claim 15, further comprising:
program instructions to, responsive to determining that the input module name of the received query is stored in the data structure identifying software modules that have been loaded into memory via directed loads, return an address range associated with a software module matching the input module name in the data structure.

17. The computer system of claim 15, further comprising:
program instructions to, responsive to determining that the input address range of the received query is stored in the data structure identifying software modules that have been loaded into memory via directed loads, return a name associated with a software module matching the input address range in the data structure.

18. The computer system of claim 15, further comprising:
program instructions to, responsive to determining that the input module name or input address range of the received query is not stored in the data structure identifying software modules that have been loaded into memory via directed loads, return an indication that no match has been found.

19. The computer system of claim 15, wherein the data structure identifying software modules that have been loaded into memory via directed loads includes a wrapping feature that replaces older entries when space for newer entries is required.

20. The computer system of claim 15, wherein the data structure identifying software modules that have been loaded into memory via directed loads is a table.

* * * * *